April 4, 1950 G. SIEVERS 2,502,802
AUTOMATIC LEVELING RETRACTABLE ELONGATED
LANDING GEAR FOR AIRCRAFT
Filed Dec. 6, 1948 2 Sheets-Sheet 1

INVENTOR
George Sievers
BY
Philip A. Riddell
Attorney

April 4, 1950     G. SIEVERS     2,502,802
AUTOMATIC LEVELING RETRACTABLE ELONGATED
LANDING GEAR FOR AIRCRAFT
Filed Dec. 6, 1948     2 Sheets-Sheet 2
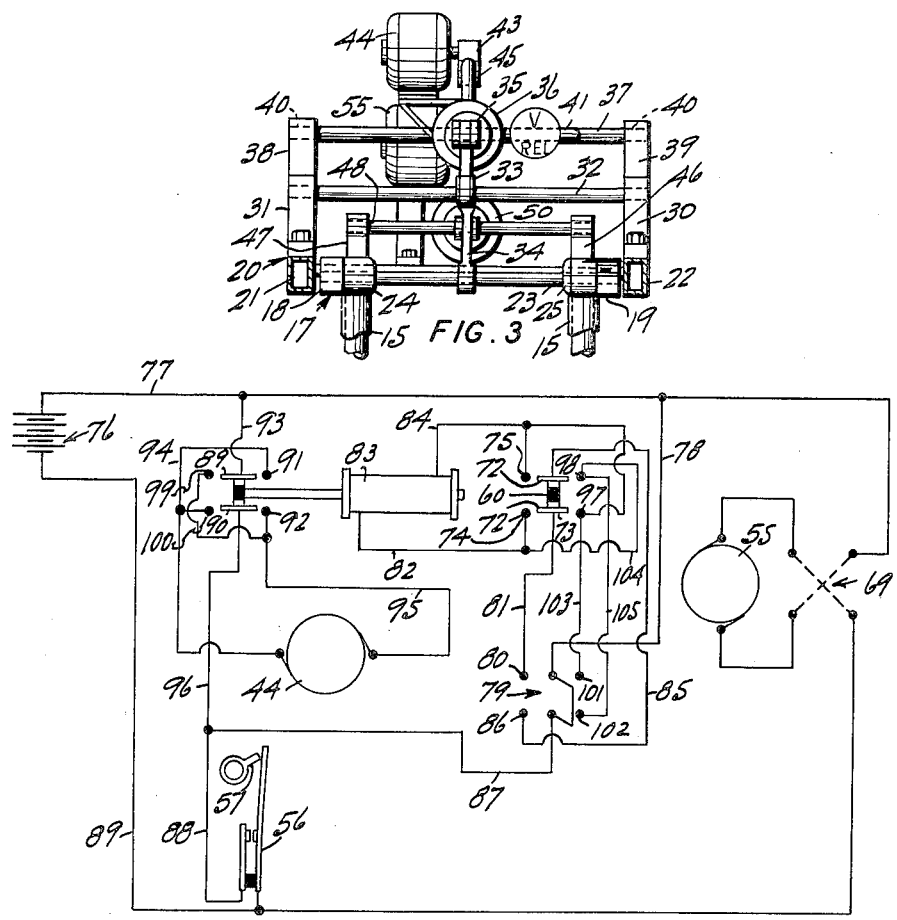
FIG. 3
FIG. 4
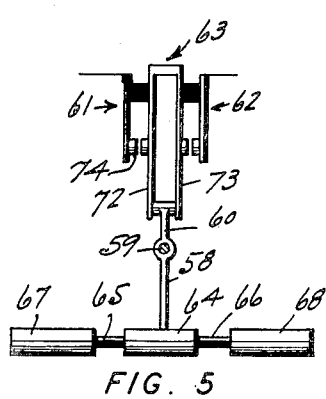
FIG. 5
INVENTOR
George Sievers
BY Philip A. Truddell
Attorney Patented Apr. 4, 1950

2,502,802

UNITED STATES PATENT OFFICE 2,502,802

AUTOMATIC LEVELING RETRACTABLE ELONGATED LANDING GEAR FOR AIRCRAFT

George Sievers, Oakland, Calif.

Application December 6, 1948, Serial No. 63,793

10 Claims. (Cl. 244—100)

This invention relates to improvements in landing gear for aircraft, and particularly to elongated types, such as tandem wheel or endless tread types of landing gears, and provides a new and improved arrangement whereby when the landing gear is in a lowered position the base or ground tread of the tandem landing wheels or endless tread will maintain a level position irrespective of the declination or inclination of the aircraft.

As is well known, when an airplane is coming in to land, the landing gear is projected but attains a definite and predetermined landing plane relative to the fuselage. The airplane noses up when nearing the ground and landing is consummated by first engaging the heel of the endless tread gear of the rear one of the tandem wheels. This tends to cause the plane to nose over until it rests on the full length of the tread or on both wheels, though requiring skill to prevent the airplane from nosing over too far and which sometimes does happen, particularly in soft or rough ground.

With one known type of endless tread landing gear it is possible to raise the toe of the landing gear when making a land turn to assist in the turn and which is accomplished through a distortion of the assembly, though it is not known of any gear which can be toed up for turning at will, and which normally keeps the gear on an even keel when projected at will, with retraction interrupting operation of the leveling means and projection restoring operation thereof, as is the case with my invention.

With my invention, as soon as the landing gear is projected it immediately attains a level keel and retains the same irrespective of the departure from level of the airplane itself. If either landing gear is to be nosed up for turning, manual control means is provided which interrupts operation of the leveling means and causes the gear to nose up. When the manual control is returned to normal position, and when the landing gear is retracted, the leveling means is made inoperative, as to both, automatic and manual control.

The objects and advantages of the invention are as follows:

First, to provide a landing gear for airplanes which, when in a projected position will assume and maintain an even and level keel irrespective of the inclinations and declinations of the fuselage, whereby tandem wheel or endless tread landing gears are caused to engage the ground at both ends simultaneously.

Second, to provide a landing gear as outlined which is retractable at will and which upon retraction will interrupt operation of the leveling means and upon projection will again restore operation.

Third, to provide a landing gear as outlined which when projected can be manually controlled for nosing up the lead end of the landing gear for turning and which simultaneously interrupts operation of the leveling means and which operation is restored when the manual control means is returned to its normal position.

In describing the invention reference will be had to the accompanying drawings, in which:

Fig. 3 is a front elevation of the operating means for control of the landing gear.

Fig. 4 is a wiring diagram for the invention.

Fig. 5 is a side elevation of the automatic leveling control.

Figure 1:
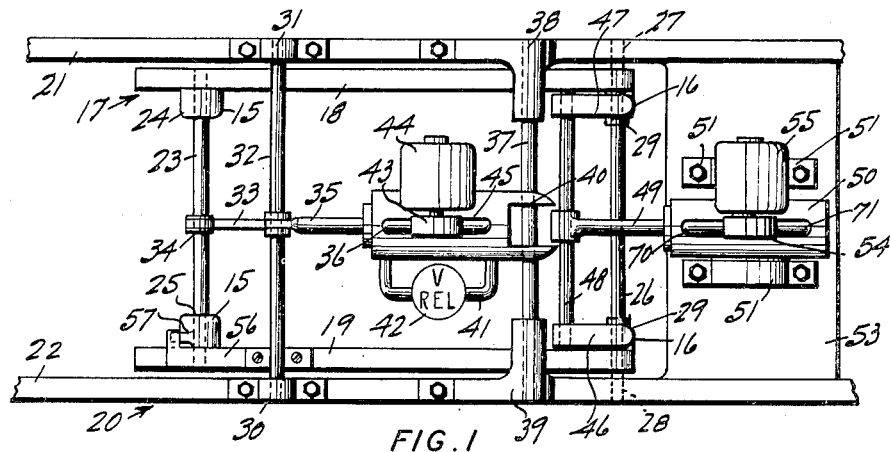
Fig. 1 is a top plan view of the invention.

The invention is applicable to either, tandem wheel, or endless tread types of landing gears and is shown as applied to an endless tread type having a frame 10, toe and heel track wheels 11 and 12 and the conventional tread and tensioning wheels 13, and an endless tread 14, and with the landing gear supported by shock-absorbing struts 15 and 16, all of which parts may be of any suitable form and combination since they do not form a part of the invention other than their cooperation therewith.

The invention consists of an inner frame 17 having side members 18 and 19, and an outer frame 20 having side members 21 and 22 and which is suitably supported by the airplane proper, such as the fuselage or wings, in any conventional manner.

A shaft 23 spans the forward end of the inner frame with the forward struts 15 pivotally supported thereon as indicated at 24 and 25. A second shaft 26 passes through the rear end of the inner frame and is pivoted in the side members 21 and 22 of the outer frame as indicated at 27 and 28 and pivotally supports the rear struts 16 as indicated at 29.

Mounted in bearings 30 and 31 which are supported by the outer frame members 21 and 22 is a shaft 32 on which a bell crank lever 33 is centrally mounted, and a link 34 connects one end of the bellcrank lever with the shaft 23, the other arm of the bellcrank lever having connection with the piston rod 35 which has a piston operating in the cylinder 36 which is pivotally supported by a shaft 37 in the bearings 38 and 39 as indicated at 40 and which bearings are supported on the outer frame members 21 and 22.

The cylinder 36 has a bypass 41 with interposed pressure relief valve 42 to function additionally as a shock absorber and conventionally as a bypass for excessive loads, and a reversible fluid pump 43 is driven by suitable means such as a reversing motor 44 to discharge in either direction through the manifold 45 which connects with the respective ends of the cylinder.

The two rear struts are provided with lever extensions 46 and 47 connected at their terminals by a cross shaft 48, and a piston rod 49 connects with this cross shaft and has a piston operating in the cylinder 50 which is pivotally supported in bearings 51 as indicated at 52, these bearings being supported by the airplane proper such as by a cross member 53 spanning the frame 20 and which may be considered as a part of the fuselage or wing structure of the airplane.

The cylinder 50 is operated by a pump 54 which is suitably driven as by a reversing motor 55 with the pump discharging in selective directions for retraction and projection of the landing gear.

A switch 56 is mounted on the inner frame and cooperates with a finger 57 on one of the eyes 24 or 25 of the front struts, to open the switch when the landing gear is retracted and to allow the switch to close when the landing gear is projected.

The automatic level control consists of a pendulum 58 which is pivotally mounted on the frame 10 of the landing gear as indicated at 59 and which pendulum has an arm 60 which selectively closes and releases the respective sides 61 and 62 of the reversing switch 63 to open, and this pendulum has a weight 64 having opposed plungers 65 and 66 which operate in the dashpots 67 and 68, the plungers operating relatively freely to permit air to escape slowly but acting to damper the pendulum, and with the pendulum guarded against strong air currents so that it will be affected only by inclinations and declinations of the landing gear.

When the landing gear is retracted, the switch 56 is open, breaking the circuits to all except the reversing switch 69 for operation of the landing gear retracting and projecting motor 55, this switch being normally open.

Figure 2:
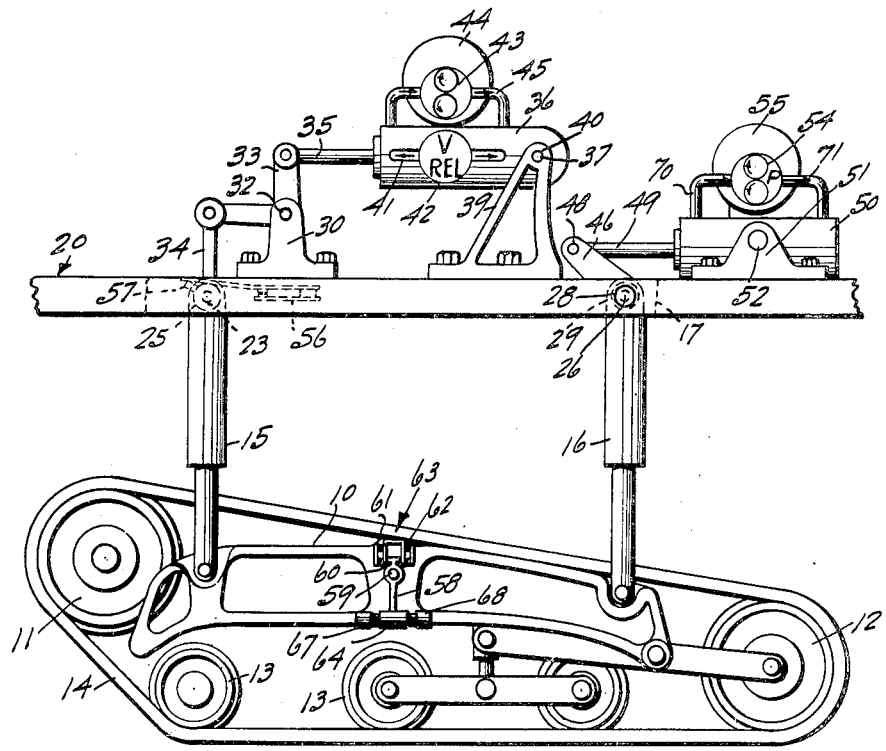
Fig. 2 is a side elevation of Fig. 1.

When the reversing switch 69 is closed to one side the motor 55 drives the pump 54 in one direction, pumping fluid from one end 70 and delivers it to the other end 71 of the cylinder 50, lowering the landing gear to the position shown in Fig. 2.

As the landing gear is lowered, the finger 57 on the front strut releases the switch 56 to close. If the bottom section of the endless tread is level, the circuit will remain broken at the switch 63 and no action takes place.

However, if the landing gear is not on a level keel, the operating arm 60 on the pendulum will cooperate with one or the other of the switch arms 72 or 73 and close one while leaving the other open. Suppose for illustration that the landing gear noses upward, then the pendulum will have swung counterclockwise viewing Figs. 2 and 5 and the arm 60 will have closed the switch members 72 and 73 to the contacts 74 and 75.

The circuit will then be completed from the source of energy 76 through conductor 77, wire 78 through manual control switch 79 to contact 80, wire 81 to switch arm 72, through contact 74, wire 82 to the solenoid or relay 83, thence through wire 84 to contact 75, thence switch arm 73, wire 85, contact 86 through switch 79, wire 87 and 88, through switch 56 and wire 89 to the source of energy 76.

The relay 83 draws the switch arms 89 and 90 to close to the contacts 91 and 92, completing circuit from the source 76 through wire 77 and wire 93 to the switch arm 89, contact 91, wire 94 to motor 44, thence from motor 44 through wire 95, to contact 92, switch arm 90, wires 96 and 88, through switch 56, and wire 89 to the source 76, operating motor 44 and pump 43, pumping the fluid from the front end of the cylinder to the rear end, driving the piston rod forward, and through the bellcrank lever 33 lowering the front end of the landing gear.

As soon as the landing gear has reached a level position, the pendulum returns to an intermediate position, breaking the circuit, with the pump maintaining the position and functioning as a lock.

If the pendulum swings to the opposite position the circuit will be completed as follows: Source 76, through wire 77, wire 78 through switch 79 (a plain double-throw switch), contact 80, wire 81, contact 97, wire 84, relay 83, wire 82, contact 98, switch arm 73, wire 85, contact 86, through switch 79, wire 87 and 88, through switch 56, and wire 89 to source 76, causing the relay to operate in the opposite direction and close the switch arms 89 and 90 to the contacts 99 and 100, completing circuit through wire 77 and 93 to switch arm 89, contact 99, wire 95, motor 44, wire 94, contact 100, switch arm 90, wire 96 and 88 through switch 56 and wire 89 to the source 76, thus reversing the motor 44 and operating the pump 42 in the opposite direction.

Should it be found desirable to raise the nose of the landing gear, such as for land turns, it is merely necessary to manually throw the switch 79 from contacts 80 and 86 to contacts 101 and 102, thus breaking the circuit to the automatic leveling switch and completing circuit through wire 77 and 78, switch 79, contact 101, wire 103 and 84 to solenoid 83, wire 82, 104 and 105 to contact 102, switch 79, and wire 87 and 88, through switch 56 and wire 89 to the source 76. As shown, the mechanism operates only for raising the front end of the landing gear, though if found necessary it could be operated in either direction by introducing a reversing switch in the manual circuit. It automatically maintains the landing gear in the adjusted position when this switch is open and returns it to level when the switch is closed to the other side.

The circuit to the retracting motor 55 is permanently completed up to the reversing switch so that it can be operated independently of the other mechanism at will, and when the landing gear is retracted, the other circuits are broken at the switch 56.

Thus the mechanism automatically levels the landing gear and maintains a level position irrespective of inclinations or declinations of the aircraft, when the landing gear is projected; disrupts operation of the leveling mechanism when the landing gear is retracted; and when projected, the landing gear is under instant manual control for raising the forward end for turns and the like.

I claim:

1. Automatic leveling means for an elongated type of landing gear for aircraft comprising; power means for raising and lowering one end of said landing gear, and gravity means and a reversing switch controlled thereby and mounted on said landing gear for reversing said power means selectively with inclinations and declinations of said landing gear with respect to a level position; in which said landing gear is retractable; and means interrupting operation of said leveling means when said landing gear is retracted and restoring operation when said landing gear is projected.

2. Automatic leveling means for an elongated type of landing gear for aircraft comprising; power means for raising and lowering one end of said landing gear, and gravity means and a reversing switch controlled thereby and mounted on said landing gear for reversing said power means selectively with inclinations and declinations of said landing gear with respect to a level position; said leveling means including a frame for supporting said landing gear and being hingedly supported at one end and adjustable at the other end, with said power means operating to selectively raise and lower said other end; in which said landing gear is retractable; and means interrupting operation of said leveling means when said landing gear is retracted and restoring operation when said landing gear is projected.

3. Automatic leveling means for an elongated type of landing gear for aircraft comprising; power means for raising and lowering one end of said landing gear, and gravity means and a reversing switch controlled thereby and mounted on said landing gear for reversing said power means selectively with inclinations and declinations of said landing gear with respect to a level position; said leveling means including a frame for supporting said landing gear and being hingedly supported at one end and adjustable at the other end, with said power means operating to selectively raise and lower said other end; said power means comprising; fluid means for raising and lowering said one end of said landing gear and a motor for driving said fluid means and a circuit therefor including said reversing switch; and a manually controlled switch for interrupting the circuit through said reversing switch and completing a circuit through said motor for raising said one end when said manually controlled switch is in one position, and for restoring said circuit through said reversing switch when said manually controlled switch is in the other position; in which said landing gear is retractable; and means interrupting operation of said leveling means when said landing gear is retracted and restoring operation when said landing gear is projected.

4. Means for maintaining an elongated type of landing gear in a level plane irrespective of inclinations or declinations of an aircraft comprising power means cooperating with one end of the landing gear for raising and lowering thereof and a support for the other end; and gravity control means including reversing means for reversing operation of said power means and supported by said landing gear coincident with variations from the level plane of said landing gear; said landing gear being projectable, and control means cooperative with one of said struts for interrupting operation of said power means when said landing gear is retracted and for restoring operation of said power means when said landing gear is projected.

5. Means for maintaining an elongated type of landing gear in a level plane irrespective of inclinations or declinations of an aircraft comprising power means cooperating with one end of the landing gear for raising and lowering thereof and a support for the other end; and gravity control means including reversing means for reversing operation of said power means and supported by said landing gear coincident with variations from the level plane of said landing gear; said landing gear having front and rear struts; a support; a frame hingedly supported at one end by said support and adjustable at the other end, and said struts being hingedly supported by said frame, and with said power means cooperating with said other end and supported by said support; said landing gear being projectable, and control means cooperative with one of said struts for interrupting operation of said power means when said landing gear is retracted and for restoring operation of said power means when said landing gear is projected.

6. Means for maintaining an elongated type of landing gear in a level plane irrespective of inclinations or declinations of an aircraft comprising power means cooperating with one end of the landing gear for raising and lowering thereof and a support for the other end; and gravity control means including reversing means for reversing operation of said power means and supported by said landing gear coincident with variations from the level plane of said landing gear; said landing gear having front and rear struts; a support; a frame hingedly supported at one end by said support and adjustable at the other end, and said struts being hingedly supported by said frame, and with said power means cooperating with said other end and supported by said support; said landing gear being projectable, and control means cooperative with one of said struts for interrupting operation of said power means when said landing gear is retracted and for restoring operation of said power means when said landing gear is projected; said power means including hydraulic means and a reversible pump therefor and a reversible motor for driving said pump, and a circuit including said reversing means; and manual control means for interrupting said circuit through said reversing means and causing operation of said power means in one direction when said manual control means is in one position, and for restoring the circuit through said reversing means when said manual control means is in the other position.

7. Means for maintaining the ground tread of an endless tread landing gear in a level plane irrespective of variations in inclination or declination of an aircraft comprising; a support; a frame hinged at one end to said support and adjustable at the other end; front and rear struts for said landing gear and each hingedly supported by said frame; reversible fluid means cooperating between said support and said other end of said frame for raising and lowering thereof, and power means for operating said fluid means and including reversing means and gravity control means therefor mounted on said landing gear and operated through inclinations and declinations of said landing gear with respect to a level position; said struts including retracting means for retracting said landing gear at will; and means cooperating with one of said struts for interrupting control by said gravity control means when said landing gear is retracted and for restoring operation when said landing gear is projected; said fluid means comprising a cylinder having a piston rod having connection with said free end; said power means comprising a reversible pump for delivering fluid from one end of said cylinder to the other, and a reversible motor for driving said pump; said gravity control means comprising a reversing switch and a pendulum for controlling said switch; a circuit including said switch and said motor and a manual control switch for breaking circuit to said reversing switch at will and for completing circuit to said motor for operation of said fluid means for manual control of the inclination of said landing gear at will, when said manual control switch is in one position and for restoring control by said pendulum when said manual control switch is in its other position.

8. Means for maintaining the ground tread of an endless tread landing gear in a level plane irrespective of variations in inclination or declination of an aircraft comprising; a support; a frame hinged at one end to said support and adjustable at the other end; front and rear struts for said landing gear and each hingedly supported by said frame; reversible fluid means cooperating between said support and said other end of said frame for raising and lowering thereof, and power means for operating said fluid means and including reversing means and gravity control means therefor mounted on said landing gear and operated through inclinations and declinations of said landing gear with respect to a level position; said struts including retracting means for retracting said landing gear at will; and means cooperating with one of said struts for interrupting control by said gravity control means when said landing gear is retracted and for restoring operation when said landing gear is projected; said fluid means comprising a cylinder having a piston rod having connection with said free end; said power means comprising a reversible pump for delivering fluid from one end of said cylinder to the other, and a reversible motor for driving said pump; said gravity control means comprising a reversing switch and a pendulum for controlling said switch; a circuit including said switch and said motor and a manual control switch for breaking circuit to said reversing switch at will and for completing circuit to said motor for operation of said fluid means for manual control of the inclination of said landing gear at will, when said manual control switch is in one position and for restoring control by said pendulum when said manual control switch is in its other position.

9. Means for maintaining the ground tread of an endless tread landing gear in a level plane irrespective of variations in inclination or declination of an aircraft comprising; a support mountable in the aircraft; a frame having one end hinged in said support and the other end adjustable; front and rear struts for said landing gear and hingedly supported in said frame; a cylinder supported by said support and having a piston rod having connection with said other end of said frame; a reversible pump for delivering fluid from one end of the cylinder to the other, and a reversible motor for driving said pump; means for selectively retracting and projecting said landing gear at will; a first reversing switch and a pendulum for operation thereof mounted on said landing gear; a relay controlled by said first reversing switch and a second reversing switch controlled by said relay; a first circuit including said first reversing switch and said relay, and a second circuit controlled by said relay and including said second reversing switch and said motor; and damping means for said pendulum.

10. A structure as defined in claim 9; a manually operative switch in said first circuit for interrupting control by said first reversing switch when the manually operative switch is in one position, for manual control of the inclination of the landing gear, and for returning the circuit to control by the first reversing switch when in the other position; a control switch cooperative with one of said struts for breaking both circuits when the landing gear is retracted and for completing the circuits for control by said reversing switches when the landing gear is projected.

GEORGE SIEVERS.

REFERENCES CITED

The following references are of record in the file of this patent:

UNITED STATES PATENTS

| Number | Name | Date |
|---|---|---|
| 1,948,951 | Walker | Feb. 27, 1934 |
| 2,099,808 | Havill | Nov. 23, 1937 |
| 2,115,701 | Baer et al. | May 3, 1938 |
| 2,263,800 | Dobson | Nov. 25, 1941 |
| 2,281,351 | Dowty | Apr. 28, 1942 |
| 2,302,343 | Noorduyn | Nov. 17, 1942 |
| 2,417,340 | Alvarez | Mar. 11, 1947 |

FOREIGN PATENTS

| Number | Country | Date |
|---|---|---|
| 447,573 | Great Britain | May 21, 1936 |